(12) United States Patent
Hayashi

(10) Patent No.: US 10,266,012 B2
(45) Date of Patent: Apr. 23, 2019

(54) PNEUMATIC TIRE

(71) Applicant: Sumitomo Rubber Industries, Ltd., Kobe-shi, Hyogo (JP)

(72) Inventor: Koji Hayashi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 707 days.

(21) Appl. No.: 14/934,342

(22) Filed: Nov. 6, 2015

(65) Prior Publication Data
US 2016/0152087 A1    Jun. 2, 2016

(30) Foreign Application Priority Data

Nov. 28, 2014 (JP) .................................. 2014-242158

(51) Int. Cl.
*B60C 11/11* (2006.01)
*B60C 11/12* (2006.01)
(Continued)

(52) U.S. Cl.
CPC ...... *B60C 11/0309* (2013.01); *B60C 11/0327* (2013.01); *B60C 11/11* (2013.01);
(Continued)

(58) Field of Classification Search
CPC ............... B60C 11/1392; B60C 11/11; B60C 11/0306; B60C 2011/1213;
(Continued)

(56) References Cited

U.S. PATENT DOCUMENTS

| 4,690,189 A * | 9/1987 | Bradisse ............. B60C 11/0302 152/209.15 |
| 2002/0069949 A1* | 6/2002 | Dorrie ..................... B60C 11/12 152/209.16 |

(Continued)

FOREIGN PATENT DOCUMENTS

DE        197 11 607 A1   12/1997
EP          1 459 908 A1    9/2004
(Continued)

OTHER PUBLICATIONS

Machine translation for Japan 2002-059711 (Year: 2018).*
(Continued)

*Primary Examiner* — Steven D Maki
(74) *Attorney, Agent, or Firm* — Birch, Stewart, Kolasch & Birch LLP

(57) ABSTRACT

A pneumatic tire 1 is provided in the tread portion 2 with crown blocks 21 each circumferentially divided into two block pieces 28, and shoulder blocks 9 each circumferentially partially divided into two block pieces 15. The block pieces 28 of the crown block 21 are a first block piece 28A having an axially outer crown chamfer 30 abutting on a shoulder main groove 3, and a second block piece 28B having no chamfer abutting on the shoulder main groove 3. The block pieces 15 of the shoulder block 9 are a first block piece 15A having an axially inner shoulder chamfer 16 abutting on the shoulder main groove 3, and a second block piece 15B having no chamfer abutting on the shoulder main groove 3. On both sides of the shoulder main groove 3, the axially inner shoulder chamfers 16 are partially circumferentially overlapped with the axially outer crown chamfers 30.

12 Claims, 4 Drawing Sheets

(51) Int. Cl.
    *B60C 11/03*     (2006.01)
    *B60C 11/13*     (2006.01)

(52) U.S. Cl.
    CPC ...... *B60C 11/1204* (2013.01); *B60C 11/1353* (2013.01); *B60C 11/1392* (2013.01); *B60C 2011/0344* (2013.01); *B60C 2011/0346* (2013.01); *B60C 2011/0348* (2013.01); *B60C 2011/0365* (2013.01); *B60C 2011/0369* (2013.01); *B60C 2011/1209* (2013.01); *B60C 2011/1213* (2013.01); *B60C 2011/1361* (2013.01)

(58) Field of Classification Search
    CPC ..... B60C 2011/0369; B60C 2011/1209; B60C 2011/0365; B60C 2011/0348
    See application file for complete search history.

(56)                References Cited

U.S. PATENT DOCUMENTS

2004/0221936 A1*   11/2004   Kaiser .................. B60C 1/00
                                                                      152/209.1
2016/0152084 A1*   6/2016   Murata ............... B60C 11/0306
                                                                      152/209.8

FOREIGN PATENT DOCUMENTS

| JP | 62-004608 A | * | 1/1987 |
|----|-------------|---|--------|
| JP | 63-125410 A | * | 5/1988 |
| JP | 2000-006620 A | * | 1/2000 |
| JP | 2002-059711 A | * | 2/2002 |
| JP | 2002-59711 A | | 2/2002 |
| JP | 2010-12978 A | | 1/2010 |
| WO | WO 2015/011964 A1 | | 9/2004 |

OTHER PUBLICATIONS

Machine translation for Japan 2000-006620 (Year: 2018).*
Machine translation for Japan 63-125410 (Year: 2018).*
Machine translation for Japan 62-004608 (Year: 2018).*
Extended European Search Report, dated Apr. 28, 2016, for corresponding European Application No. 15194300.8. F.

* cited by examiner

PNEUMATIC TIRE

TECHNICAL FIELD

The present invention relates to a pneumatic tire, more particularly to a tread pattern capable of improving snow/ice performance and steering stability.

BACKGROUND ART

Recently, winter tires originally designed for use on snowy/icy roads become widely used on dry pavements too. Such winter tires are therefore, required to exhibit good snow/ice performance as well as excellent steering stability on dry pavements.

Usually, a winter tire is provided in the tread portion with a large number of sipes in order to improve ice performance. As the formation of a large number of sipes decreases the rigidity of the tread portion, it is difficult for such tire to exhibit excellent steering stability on dry pavements.

SUMMARY OF THE INVENTION

Problems to be Resolved by the Invention

It is therefore, an object of the present invention to provide a pneumatic tire in which the steering stability and the snow/ice performance can be improved in good balance.

Means of Solving the Problems

According to the present invention, a pneumatic tire comprises
a tread portion provided with a pair of shoulder main grooves and a center main groove extending continuously in the tire circumferential direction so as to define a pair of shoulder land regions between the shoulder main grooves and the tread edges, and a pair of crown land regions between the shoulder main grooves and the center main groove,
wherein
    each of the shoulder land regions is circumferentially divided by shoulder lateral grooves into shoulder blocks,
    each of the crown land regions is circumferentially divided by crown lateral grooves into crown blocks,
    each of the crown block is circumferentially divided by a crown sipe into a pair of block pieces which are
a first block piece whose axially outer edge abutting on the shoulder main groove is chamfered to define an axially outer crown chamfer, and
a second block piece whose axially outer edge abutting on the shoulder main groove is not chamfered or less chamfered than the axially outer crown chamfer, and
    each of the shoulder blocks is provided with a shoulder sipe extending axially outwardly from the shoulder main groove to circumferentially divide at least an axially inner part of the shoulder block into a pair of block pieces which are
a first block piece whose axially inner edge abutting on the shoulder main groove is chamfered to define an axially inner shoulder chamfer, and
a second block piece whose axially inner edge abutting on the shoulder main groove is not chamfered or less chamfered than the axially inner shoulder chamfer, and
    on both sides of each of the shoulder main grooves, each of the axially inner shoulder chamfers has an overlap with one of the axially outer crown chamfers in the tire circumferential direction.

Further, the pneumatic tire according to the present invention may have the following features (1)-(7):
(1) with respect to the crown blocks and the shoulder blocks disposed on both sides of each shoulder main groove, the first block pieces of the crown blocks and the first block pieces of the shoulder blocks are disposed on one side in the tire circumferential direction of the respective paired second block pieces;
(2) the crown sipes are zigzag;
(3) each of the shoulder blocks is provided with a narrow longitudinal shoulder groove extending between the circumferentially adjacent shoulder lateral grooves;
(4) the shoulder sipe terminates without reaching to the narrow longitudinal shoulder groove;
(5) each of the shoulder lateral grooves is composed of an inside portion extending axially outwardly from the shoulder main groove, and an outside portion being larger in the groove width than the inside portion;
(6) each of the second block pieces of the crown blocks has an axially inner edge abutting on the center main groove which is chamfered to have an axially inner crown chamfer,
    each of the first block pieces of the crown blocks has an axially inner edge abutting on the center main groove which is not chamfered or less chamfered than the axially inner crown chamfer, and
    the axially inner crown chamfers on one side of the center main groove overlap in the tire circumferential direction with the axially inner crown chamfers on the other side of the center main groove;
(7) each of the crown lateral grooves comprises
a deep central portion in its length direction, and
a shallow end portion positioned on each side of the deep central portion in the length direction and having a groove depth less than that of the deep central portion.

According to the present invention, therefore the crown sipes exhibit edge effect and improve snow/ice performance. The axially outer crown chamfer of the first block piece can derives large edge effect from the edges on the shoulder main groove side of the second block piece. Therefore, the crown blocks improve the steering stability and the snow/ice performance. The shoulder sipes exhibit edge effect and improve the snow/ice performance. The axially inner shoulder chamfer of the first block piece can derives large edge effect from the edges on the shoulder main groove side of the second block piece. Therefore, the shoulder blocks improve the steering stability and the snow/ice performance.
The partial overlap between the axially inner shoulder chamfer and the axially outer crown chamfer increases the groove width of the shoulder main groove, and it is possible to increase the shearing force of compacted snow in the shoulder main groove, therefore, snow performance can be improved.

As a result, the pneumatic tire according to the present invention can exhibit excellent steering stability and the snow/ice performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "sipe" means a narrow groove whose width is less than 2.0 mm including a cut having no substantial groove width.

The term "groove" means a groove whose width is 2.0 mm or more.

DESCRIPTION OF THE PREFERRED EMBODIMENTS

Embodiments of the present invention will now be described in detail in conjunction with the accompanying drawings.

A pneumatic tire 1 as an embodiments of the present invention comprises a tread portion 2, a pair of axially spaced bead portions, a pair of sidewall portions extending between the tread edges and the bead portions, a carcass extending between the bead portions, and a tread reinforcing cord layer disposed radially outside the carcass in the tread portion as usual.

The present invention is suitably applied to passenger car tires. In this embodiment, therefore, the pneumatic tire 1 is designed as a passenger car tire.

The tread portion 2 is provided with circumferentially continuously extending main grooves including a pair of axially outermost shoulder main grooves 3 and a center main groove 4 therebetween.

Figure 1:
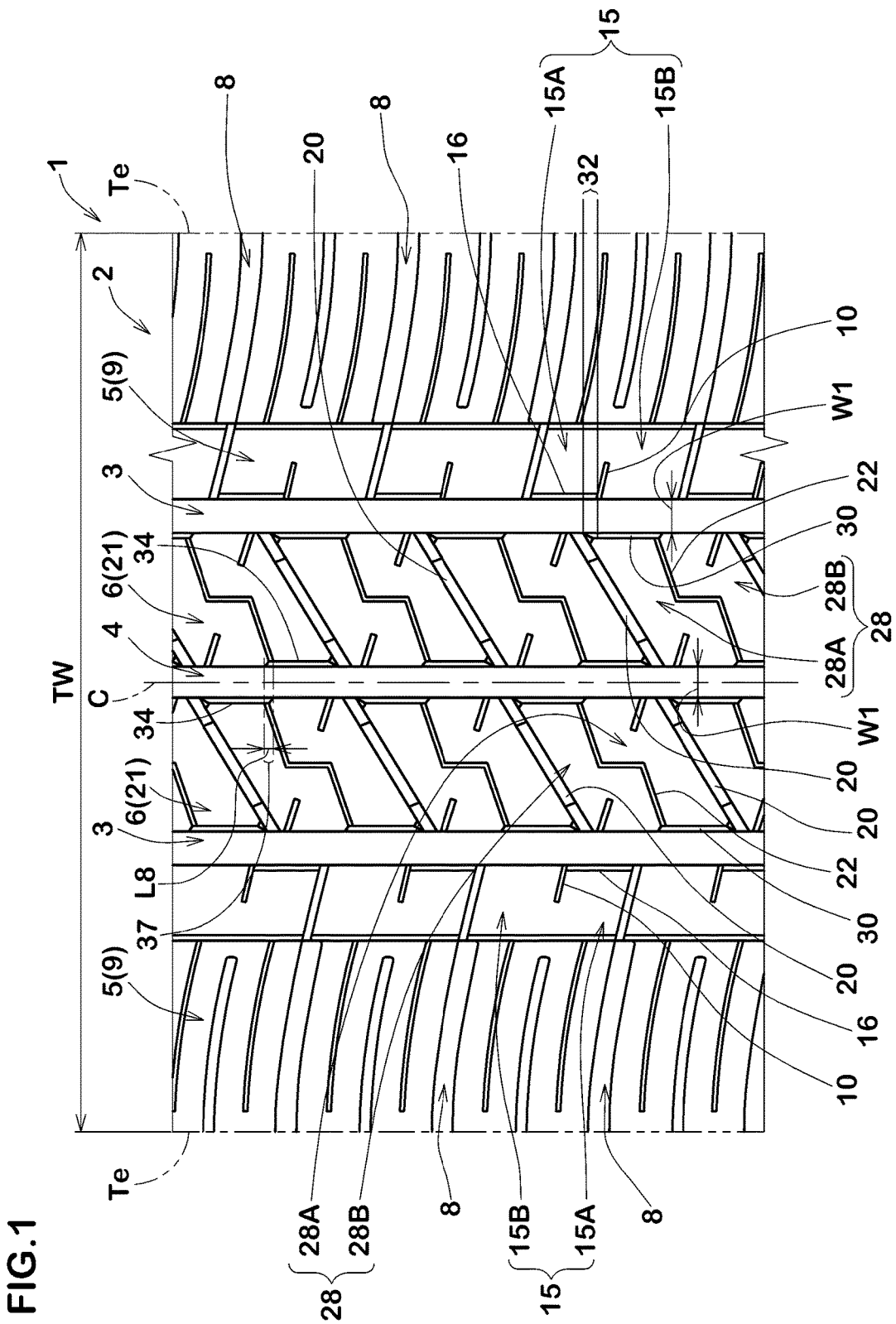
FIG. 1 is a developed partial view of the tread portion of a pneumatic tire as an embodiment of the present invention.

In this embodiment, in order not to decrease the rigidity of edge portions of the land regions and thereby to improve the steering stability and also in order to expedite snow ejection from the main grooves 3 and 4, as shown in FIG. 1, each of the main grooves 3 and 4 is formed as a straight groove whose edges are substantially straight and parallel with the tire circumferential direction.

From a standpoint of improving the snow ejection performance during running on snowy/icy roads and steering stability during running on dry pavements in good balance, the groove widths W1 of the main grooves 3 and 4 are preferably set in a range of from 2% to 9% of the tread width TW, and the groove depth D1 of the shoulder main grooves 3 and the groove depth of the center main groove 4 are preferably set in a range of from 5 to 10 mm.

The tread portion 2 is divided by the main grooves 3 and 4 into a pair of shoulder land regions 5 between the shoulder main grooves 3 and the tread edges Te, and a pair of crown land regions 6 between the center main groove 4 and the shoulder main grooves 3.

Figure 2:
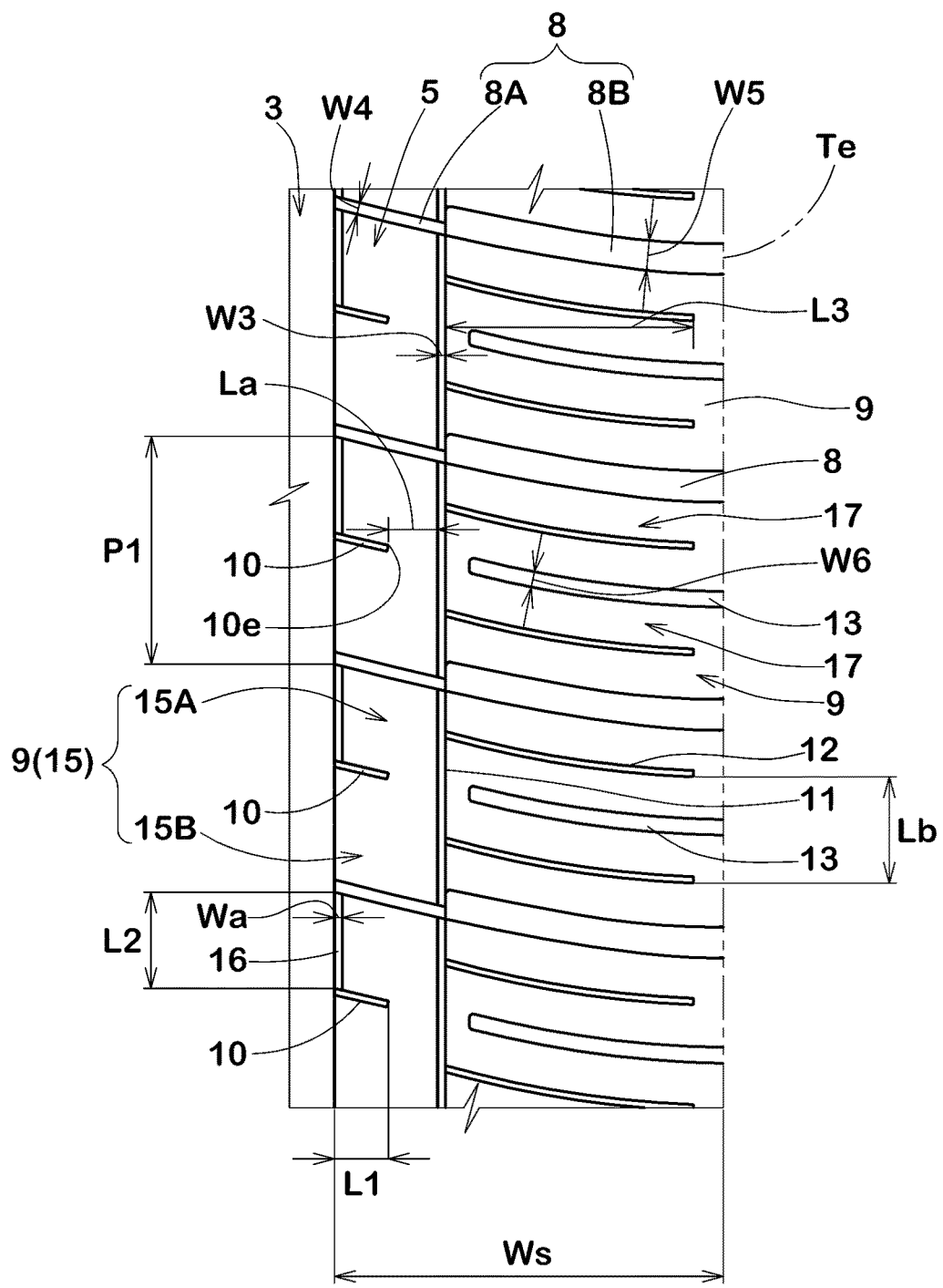
FIG. 2 is a closeup of a shoulder land region shown in FIG. 1.

In each of the shoulder land regions 5, as shown in FIG. 2, shoulder lateral grooves 8 extending from the shoulder main groove 3 to the tread edge Te are arranged in the tire circumferential direction at intervals. Thereby, the shoulder land region 5 is divided into shoulder blocks 9 in a row.

The shoulder lateral groove 8 is composed of a narrow inside groove portion 8A extending axially outwardly from the shoulder main groove 3, and a wide outside groove portion 8B whose groove width is larger than that of the narrow inside groove portion 8A.

The wide outside groove portions 8B enhance tire traction on snow/ice and wet performance.

The narrow inside groove portions 8A minimize the decrease in the rigidity of the axially inner part (subjected to a relatively high ground pressure) of the shoulder land region 5 to provide good steering stability.

From a standpoint of improving the steering stability by increasing the rigidity of the axially inner part of the shoulder block 9, the groove width W4 of the narrow inside groove portion 8A is preferably set in a range of from 30% to 50% of the groove width W5 of the wide outside groove portion 8B.

Further, the groove width W5 of the wide outside groove portion 8B is preferably set in a range of from 50% to 70% of the groove width W1 of the shoulder main groove 3 in order to obtain good tire traction on snow by the shearing force of compacted-snow in the wide outside groove portions 8B without sacrificing the rigidity of the axially outer part of the shoulder blocks 9.

In this embodiment, the groove width W4 of the narrow inside groove portion 8A is constant along its length, and the groove width W5 of the wide outside groove portion 8B is also constant along its length.

As shown in FIG. 2, each shoulder block 9 is provided with a narrow longitudinal shoulder groove 11, an axially inner shoulder sipe 10, axially outer shoulder sipes 12, and a shoulder blind groove 13.

The narrow longitudinal shoulder groove 11 extends straight between the shoulder lateral grooves 8 across the shoulder block 9 in the tire circumferential direction in order to exert great edge effect in the tire axial direction to improve the ice performance during cornering especially.

The axially inner shoulder sipe 10 extends axially outwardly from the shoulder main groove 3 and terminated within the shoulder block 9 to have an axially inner open end and an axially outer closed end in order to exert edge effect while securing rigidity for the shoulder block 9.

The axial length L1 of the axially inner shoulder sipe 10 is preferably set in a range of from 5% to 25% of the axial width Ws of the shoulder block 9.
If the axial length L1 is less than 5% of the axial width Ws, effective edge effect can not be obtained, and ice performance can not be improved. If the axial length L1 is more than 25% of the axial width Ws, there is a possibility that the rigidity of the shoulder block 9 is decreased, and the steering stability is deteriorated.

The axially inner shoulder sipe 10 divides in the tire circumferential direction an axially inner part of the shoulder block 9 abutting on the shoulder main groove 3 into block pieces 15, which are, in this embodiment, a first block piece 15A on one side in the tire circumferential direction (in FIG. 2, upper side), and a second block piece 15B on the other side in the tire circumferential direction (in FIG. 2, under side).
This (one side and the other side) applies to all of the shoulder blocks 9 in each shoulder land region 5.

Figure 3:
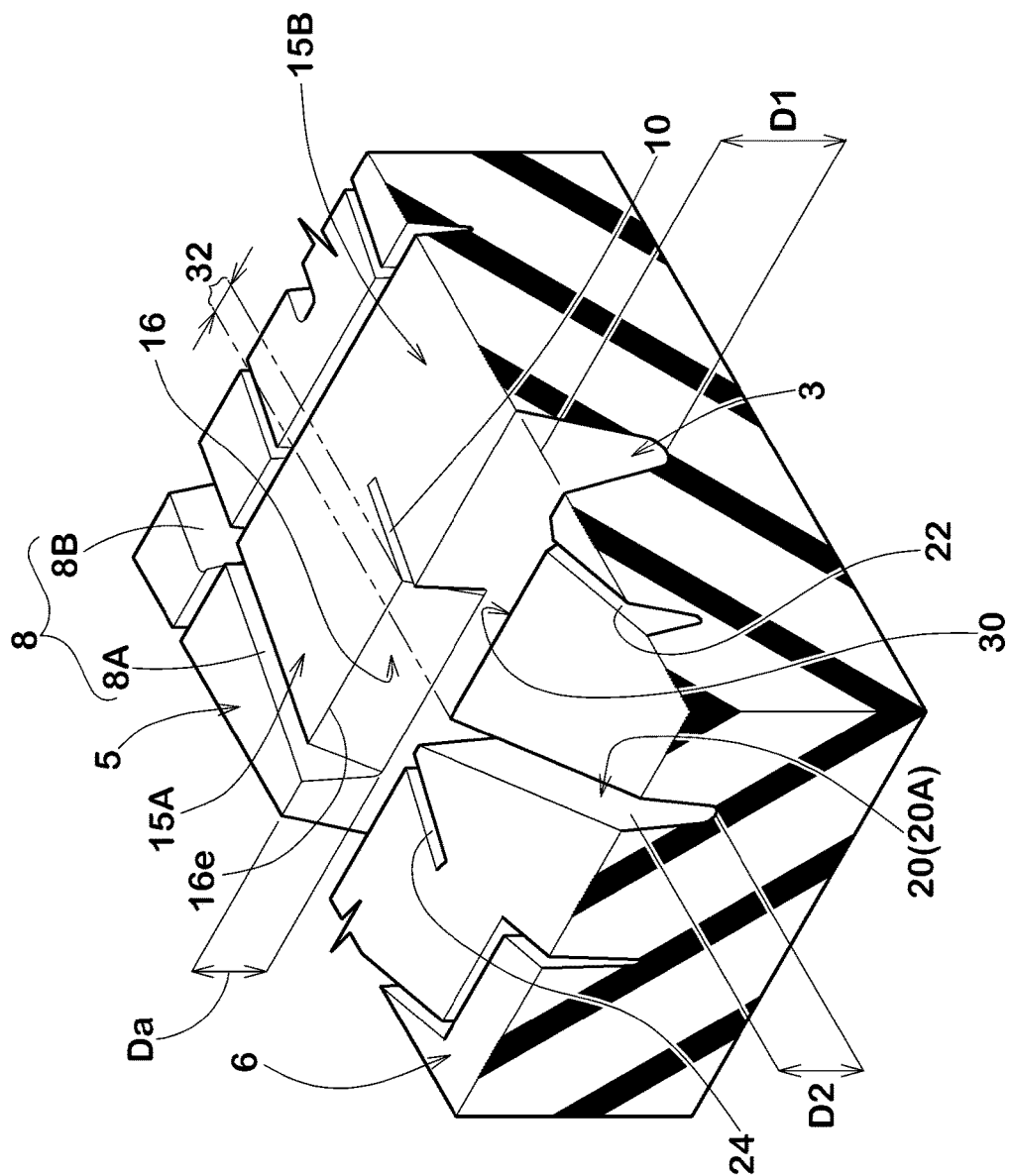
FIG. 3 is a perspective view of an axially inner shoulder chamfer.

As shown in FIG. 3, the second block piece 15B has an axially inner edge abutting on the shoulder main groove 3 which is not chamfered, whereas the first block piece 15A has an axially inner edge abutting on the shoulder main groove 3 which is chamfered to have an axially inner shoulder chamfer 16.

The axially inner shoulder chamfer 16 is a substantially flat surface tilted axially outwardly (away from the center of the shoulder main groove 3) and intersecting with the ground contacting top surface of the shoulder block 9 so as to form an angled corner (slightly larger than 90 degrees) having an edge 16e.

As shown in FIG. 2, in the top view, the axial width Wa of the axially inner shoulder chamfer 16 (namely, the axial distance between the upper edge and lower edge of the tilted flat surface) is preferably set in a range of 5% to 25% of the groove width W1 of the shoulder main groove 3.

Preferably, the depth Da of the axially inner shoulder chamfer 16 (namely, the radial distance between the upper edge and lower edge of the tilted flat surface) is set in a range of from 35% to 55% of the groove depth D1 of the shoulder main groove 3.

The axially inner shoulder chamfer 16 is formed along the substantially entire length of the above-mentioned axially inner edge, namely, extends between the axially inner shoulder sipe 10 and the shoulder lateral groove 8.

Preferably, the circumferential length L2 of the axially inner shoulder chamfer 16 (corresponding to the circumferential distance from the shoulder lateral groove 8 to the axially inner shoulder sipe 10) is set in a range of from 35% to 55% of one pitch P1 of the shoulder lateral grooves 8.

Owing to the edge 16e, the axially inner shoulder chamfer 16 does not decrease the original edge effect, therefore, the ice performance, wet performance, and steering stability on dry pavements especially during cornering can be maintained.

The compacted snow in the shoulder main groove 3 is subjected to shear in the tire circumferential direction by the radially extending edges (shown in FIG. 3) of the second block pieces 15B.
Further, as the compacted snow in the shoulder main groove 3 is increased in the width and volume by the axially inner shoulder chamfers 16, the shearing force of the compacted snow is increased, therefore, snow performance such as traction on snow and cornering performance on snow can be improved.

If the axial width Wa of the axially inner shoulder chamfer 16 is more than 25% of the groove width W1 of the shoulder main groove 3, there is a possibility that the ground contacting area of the first block piece 15A is decreased, and the steering stability is deteriorated. Further, as the groove volume of the shoulder main groove 3 is increased, there is a possibility that, during running on dry pavement, air in the shoulder main groove 3 in the ground contacting patch of the tire resonates and noise performance is deteriorated.
If the width Wa is less than 5% of the width W1, an effective shearing force by the radially extending edges of the second block pieces 15B can not be obtained.

As can be seen from the above description, the radially extending edges of the second block pieces 15B serve to generate the shearing force of the compacted snow in the tire circumferential direction. Therefore, the second block piece 15B can be provided with a chamfer similarly to the axially inner shoulder chamfer 16 as far as the axial width Wa is smaller than that of the axially inner shoulder chamfer 16 and the difference in the axial width Wa is in a range of 5% to 25% of the groove width W1 of the shoulder main groove 3. For example, the circumferential length of the chamfered part of the second block piece 15B may be not more than 20% of the circumferential length L2 of the axially inner shoulder chamfer 16 of the first block piece 15A.

The axially inner shoulder sipe 10 is terminated without reaching to the narrow longitudinal shoulder groove 11 in order to prevent the axially inner part of the shoulder block 9 from being decreased in the rigidity.

From this standpoint, the shortest distance La between the axially inner shoulder sipe and the narrow longitudinal shoulder groove 11 is preferably set in a range of from 5% to 20% of the axial width Ws of the shoulder block 9, and the groove width W3 of the narrow longitudinal shoulder groove 11 is preferably set in a range of from 5% to 25% of the groove width W1 of the shoulder main groove 3.

From the narrow longitudinal shoulder grooves 11, the outside portions 8B of the shoulder lateral grooves 8 extend axially outwardly in order to improve snow/ice performance.

The axially outer shoulder sipes 12 extend axially outwardly from the narrow longitudinal shoulder groove 11 and terminates within the shoulder block 9 without reaching to the tread edge Te.
In this embodiment, per each shoulder block 9, two axially outer shoulder sipes 12 are arranged in the tire circumferential direction in parallel with each other in order to increase the edge effect in the tire circumferential direction of the shoulder block 9, while maintaining the rigidity of the shoulder block 9 in its tread edge side.
Preferably, the axial length L3 of the axially outer shoulder sipe 12 is set in a range of from 55% to 75% of the axial width Ws of the shoulder block 9.

The above-mentioned shoulder blind groove 13 extends axially inwardly from the tread edge Te and terminates without reaching to the narrow longitudinal shoulder groove 11.
Such shoulder blind groove 13 contributes to obtain a large compacted-snow shearing force without sacrificing the rigidity of the shoulder block 9, and improves the steering stability and the snow/ice performance in good balance.

In this embodiment, the shoulder blind groove 13 is disposed between the two axially outer shoulder sipes 12 in order that two portions 17 formed between the shoulder blind groove 13 and the two axially outer shoulder sipes 12 have even rigidity and the steering stability can be improved.
Preferably, the groove width W6 of the shoulder blind groove 13 is set in a range of from 20% to 40% of the groove width W1 of the shoulder main groove 3.

Figure 4:
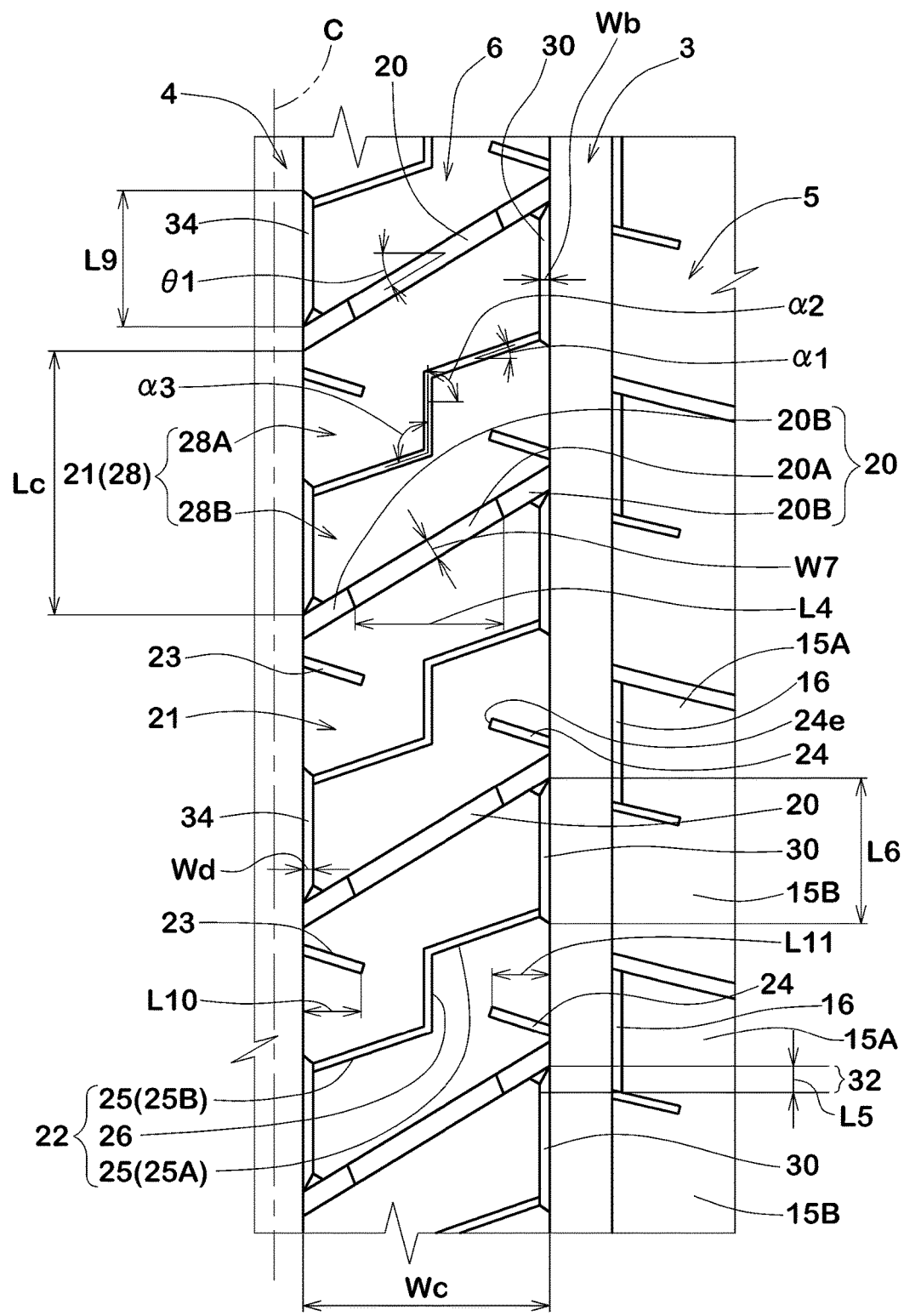
FIG. 4 is a closeup of a crown land region shown in FIG. 1.

The above-mentioned crown land regions 6 are each provided with crown lateral grooves 20 extending from the center main groove 4 to the shoulder main groove 3. Thereby, the crown land region 6 is divided in the tire circumferential direction into crown blocks 21 in a row as shown in FIG. 4.

The crown lateral groove 20 comprises a deep central portion 20A in its length direction, and a shallow end portion 20B disposed on each side of the deep central portion 20A in the length direction and having a groove depth less than that of the deep central portion 20A.

Such deep central portion 20A helps to increase the compacted-snow shearing force. At the same time, the rigidity of the crown block 21 is maintained in the neighborhood of the shallow end portions 20B, and the edge effect of the crown block 21 is increased. Therefore, snow/ice performance can be improved.

In order to effectively derive the above described advantageous effects, the axial length L4 of the central portion 20A is preferably set in a range of from 50% to 70% of the axial width Wc of the crown block 21,
the groove depth of the shallow end portion 20B is preferably set in a range of from 55% to 75% of the groove depth D2 of the deep central portion 20A, and
the groove depth D2 of the deep central portion 20A is preferably set in a range of from 60% to 80% of the groove depth D1 of the shoulder main groove 3.

The groove width of the crown lateral groove 20 is constant along the length thereof in order that the edge portions of the crown block 21 abutting on the crown lateral grooves 20 are prevented from being partially decreased in the rigidity, and water in the crown grooves is smoothly led to the main grooves 3 and 4.

Preferably, the groove width W7 of the crown lateral groove 20 is set in a range of from 5% to 15% of the circumferential length Lc of the crown block 21.

Preferably, the inclination angle θ1 of the crown lateral groove 20 with respect to the tire axial direction is set in a range of from 20 to 40 degrees so that the edge effect can be exerted in the tire circumferential direction and tire axial direction.

As shown in FIG. 4, the crown block 21 is provided with a crown traverse sipe 22, an axially inner crown sipe 23 and an axially outer crown sipe 24.

The crown traverse sipe 22 extends from the center main groove 4 to the shoulder main groove 3 so that the crown block 21 is divided in the tire circumferential direction into block pieces 28 which are a first block piece 28A on one side in the tire circumferential direction (in FIG. 4, upper side), and a second block piece 28B on the other side in the tire circumferential direction (in FIG. 4, under side).
This (one side and the other side) applies to all of the crown blocks 21 in each crown land region 6.

The first block piece 28A of the crown block 21 has an axially outer edge abutting on the shoulder main groove 3 which is chamfered to have an axially outer crown chamfer 30.

The second block piece 28B of the crown block 21 has an axially outer edge abutting on the shoulder main groove 3 which is not chamfered in this embodiment.

The axially outer crown chamfer 30 is a substantially flat surface tilted axially inwardly (away from the center of the shoulder main groove 3) and intersecting with the ground contacting top surface of the crown block 21 so as to form an angled corner (slightly larger than 90 degrees) having an edge.

The axially outer crown chamfer 30 is formed along the substantially entire length of the axially outer edge of the first block piece 28A abutting on the shoulder main groove 3. In this embodiment, therefore, the axially outer crown chamfer 30 extends from the crown lateral groove 20 to the crown traverse sipe 22.

As shown in FIG. 4, in the top view of the crown block 21, the axial width Wb of the axially outer crown chamfer 30 is preferably set in a range of from 80% to 120% of the above-mentioned axial width Wa of the axially inner shoulder chamfer 16.

The circumferential length L6 of the axially outer crown chamfer 30 is preferably set in a range of from 80% to 120% the circumferential length L2 of the axially inner shoulder chamfer 16.

The depth of the axially outer crown chamfer 30 measured in the tire radial direction from the upper edge to the lower edge of the chamfer 30 is preferably set in a range of from 35% to 55% of the groove depth D1 of the shoulder main groove 3 similarly to the depth Da of the axially inner shoulder chamfer 16.

Thereby, the rigidity of the crown block 21 and the rigidity of the shoulder block 9 are balanced, and good steering stability can be secured.

The axially outer crown chamfer 30 has an partial overlap (hereinafter, the first partial overlap 32) with the above-mentioned axially inner shoulder chamfer 16 in the tire circumferential direction.
The first partial overlap 32 increases the groove width of the shoulder main groove 3. Such increased groove width can increase the compacted-snow shearing force, therefore, snow performance can be improved.

In order to effectively derive the above described advantageous effects, the circumferential length L5 of the first partial overlap 32 is preferably set in a range of not less than 3% of the circumferential length Lc of the crown block 21.
If the circumferential length L5 of the first partial overlap 32 is increased, as the shoulder main groove 3 becomes wide as a whole, there is a possibility that the shoulder main groove 3 generates air resonance sound when running on dry pavement and noise performance is deteriorated.
Therefore, it is preferable that the circumferential length L5 of the first partial overlap 32 is not more than 15% of the circumferential length Lc of the crown block 21.

Further, as shown in FIG. 4, the first partial overlap 32 is formed between the crown lateral groove 20 and the axially inner shoulder sipe 10.

In this embodiment, on each side of the center main groove 4, the second block piece 28B of the crown block 21 has an axially inner edge abutting on the center main groove 4 which is chamfered to have an axially inner crown chamfer 34, and the first block piece 28A of the crown block 21 has an axially inner edge abutting on the center main groove 4 which is not chamfered.
It is however also possible that the axially inner edge of the first block piece 28A is chamfered as far as the axial width of the chamfer is less than that of the axially inner crown chamfer 34.

Therefore, on each side of the center main groove 4, the second block pieces 28B with the axially inner crown chamfer 34 and the first block pieces 28A with no chamfer or less chamfer are alternately arranged in the tire circumferential direction. Thereby, the radially extending edges of first block piece 28A abutting on the center main groove 4 can exert edge effect on the compacted snow in the center main groove 4.

The axially inner crown chamfer 34 is formed along the substantially entire length of the axially inner edge of the second block piece 28B of the crown block 21 as shown in FIG. 4. In this embodiment, therefore, the axially inner crown chamfer 34 extends from the crown traverse sipe 22 to the crown lateral groove 20.

As shown in FIG. 4, in the top view, the axial width Wd of the axially inner crown chamfer 34 is preferably set in a range of from 80% to 120% of the axial width Wa of the axially inner shoulder chamfer 16.

The depth of the axially inner crown chamfer 34 measured in the tire radial direction from the upper edge to the lower edge of the chamfer 34 is preferably set in a range of from 35% to 55% of the groove depth of the center main groove 4.

The circumferential length L9 of the axially inner crown chamfer 34 is preferably set in a range of from 80% to 120% of the circumferential length L6 of the axially outer crown chamfer 30.

As shown in FIG. 1, each of the axially inner crown chamfers 34 on one side of the center main groove 4 has a partial overlap (hereinafter, the second partial overlap 37) in the tire circumferential direction with one of the axially inner crown chamfers 34 on the other side of the center main groove 4. The second partial overlap 37 increase the groove width of the center main groove 4. Such increased groove width can increase the compacted-snow shearing force, therefore, snow performance can be improved.

Preferably, the circumferential length L8 of the second partial overlap 37 is set in a range of from 2% to 12% of the circumferential length Lc of the crown block 21.
If the circumferential length L8 is less than 2% of the circumferential length Lc, it is difficult to increase the compacted-snow shearing force. If the circumferential length L8 is more than 12% of the circumferential length Lc, as the center main groove 4 becomes wide as a whole, there is a possibility that the center main groove 4 generates air resonance sound when running on dry pavement and noise performance is deteriorated.

In general, the center main groove 4 is liable to generate air resonance sound in comparison with the shoulder main groove 3, therefore, in order to make it difficult to generate air resonance sound, the circumferential length L8 of the second partial overlap 37 is preferably set to be less than the circumferential length L5 of the first partial overlap 32.

The crown traverse sipe 22 is zigzag in order to make it possible to exert an edge effect in multi directions to improve snow/ice performance.

The crown traverse sipe 22 comprises
gently inclined parts 25 inclined with respect to the tire axial direction at a small angle $\alpha 1$, and
a steeply inclined part 26 inclined with respect to the tire axial direction at an angle $\alpha 2$ larger than the angle $\alpha 1$.
In this embodiment, the gently inclined parts 25 are an axially outer gently inclined part 25A extend axially inwardly from the shoulder main groove 3, and an axially inner gently inclined part 25B extending axially outwardly from the center main groove 4.
The steeply inclined part 26 connects between the axially outer gently inclined part 25A and the axially inner gently inclined part 25B.
Such crown traverse sipe 22 exerts an edge effect in the tire axial direction, and improves the stability during running straight on snowy/icy roads.

From a standpoint of the rigidity of the crown block 21, the angle $\alpha 3$ between the gently inclined part 25 and the steeply inclined part 26 is preferably set to be not less than 90 degrees.
In order to exert the edge effect in different directions, the angle $\alpha 3$ is preferably not more than 150 degrees, more preferably not more than 140 degrees.
For example, in order to improve the steering stability on icy roads, the inclination angle $\alpha 1$ of the gently inclined part 25 with respect to the tire axial direction is preferably set in a range of from 10 degrees to 50 degrees.
For example, in order to improve the stability during running straight on icy roads, the inclination angle $\alpha 2$ of the steeply inclined part 26 with respect to the tire axial direction is preferably set in a range of not less than 80 degrees.

The above-mentioned axially inner crown sipe 23 is disposed on the first block piece 28A.
The axially inner crown sipe 23 extends axially outwardly from the center main groove 4 and terminates within the first block piece 28A in order to increase the edge effect without deteriorating the rigidity of the first block piece 28A.

The above-mentioned axially outer crown sipe 24 is disposed on the second block piece 28B.
The axially outer crown sipe 24 extends axially inwardly from the shoulder main groove 3 and terminates within the second block piece 28B in order to increase the edge effect without deteriorating the rigidity of the second block piece 28B.

The axially inner crown sipes 23 and the axially outer crown sipes 24 are inclined with respect to the tire axial direction to one direction opposite to the overall inclining direction of the crown traverse sipes 22 with respect to the tire axial direction in order to secure the stability during running straight on snowy/icy roads.
In each of the crown blocks 21, the axially inner crown sipe 23 and the axially outer crown sipe 24 are arranged substantially in line, and the inner end 24e of the axially outer crown sipe 24 is positioned on an axially outward extension of the axially inner crown sipe 23.

In order to satisfy the rigidity and edge effect of the crown block 21 at a highly sophisticated level, the axial length L10 of the axially inner crown sipe 23 and the axial length L11 of the axially outer crown sipe 24 are preferably set in a range of from 15% to 35% of the axial width Wc of the crown block 21.

Comparison Tests

Based on the tread pattern shown in FIG. 1, pneumatic tires of size 195/65R15 (rim size: 5.5X15J) having specifications listed in Table 1 were experimentally manufactured, and tested for the snow/ice performance, steering stability and noise performance.

Common specifications are as follows:

axially inner shoulder chamfer length/shoulder lateral grooves' pitch=44% axially outer crown chamfer length/crown block circumferential length=52% axially inner crown chamfer length/crown block circumferential length=52% axially inner shoulder chamfer depth/shoulder main groove depth=48% axially outer crown chamfer depth/shoulder main groove depth=48% axially inner crown chamfer depth/center main groove depth=47%

<Snow/Ice Performance and Steering Stability Test>
During running a 1800 cc front-drive passenger car provided on all of the four wheels with the test tires (tire pressure: 240 kPa) on snowy/icy road of a test course and dry asphalt road of a test course, the snow/ice performance and steering stability of the tire was evaluated by the test driver based on steering responsiveness, traction, grip and the like. The results are indicated in Table 1 by an index based on Comparative example tire Ref. 1 being 100, wherein the larger the value, the better the performance.
<Noise Performance Test>
Using the above-mentioned test car, noise during running on dry asphalt road at 50 km/h was measured near the head rest of the driver's seat. The results are indicated in Table 1 by an index based on comparative example tire Ref. 1 being 100, wherein the larger the value, the better the performance.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| first partial overlap/Lc (%) | — | 8 | 2 | 3 | 15 | 17 | 8 | 8 | 8 | 8 |
| second partial overlap/Lc (%) | — | 6 | 6 | 6 | 6 | 6 | 1 | 2 | 12 | 15 |
| snow/ice performance | 100 | 110 | 109 | 110 | 110 | 111 | 109 | 110 | 110 | 111 |
| steering stability | 100 | 110 | 108 | 109 | 111 | 111 | 108 | 109 | 111 | 111 |
| noise performance | 100 | 100 | 100 | 100 | 98 | 96 | 100 | 100 | 98 | 96 |

From the test results, it was confirmed that, in comparison with comparative example tire, Embodiment tires were improved in the snow/ice performance, steering stability and noise performance in good balance.

REFERENCE SIGNS LIST 1 pneumatic tire
9 shoulder block
15 block piece
15A first block piece
15B second block piece
16 axially inner shoulder chamfer
21 crown block
28 block piece
28A first block piece
28B second block piece
30 axially outer crown chamfer
32 partial overlap

The invention claimed is:

1. A pneumatic tire comprising a tread portion provided with a pair of shoulder main grooves and a center main groove extending continuously in the tire circumferential direction so as to define a pair of shoulder land regions between the shoulder main grooves and the tread edges, and a pair of crown land regions between the shoulder main grooves and the center main groove, wherein
   each said shoulder land region is circumferentially divided by shoulder lateral grooves into shoulder blocks,
   each said crown land region is circumferentially divided by crown lateral grooves into crown blocks,
   each said crown block is made up of a pair of block pieces circumferentially divided by a crown sipe which are
   a first block piece having an axially outer edge abutting on the shoulder main groove that is chamfered by a substantially constant width along its substantially entire length to define an axially outer crown chamfer, and
   a second block piece having an axially outer edge abutting on the shoulder main groove that is not chamfered along its substantially entire length or alternatively less chamfered by a substantially constant width less than the axially outer crown chamfer along its substantially entire length,
   each said shoulder block is provided with a shoulder sipe extending axially outwardly from the shoulder main groove to circumferentially divide an axially inner part of the shoulder block into only two block pieces which are a first block piece having an axially inner edge abutting on the shoulder main groove that is chamfered by a substantially constant width along its substantially entire length to define an axially inner shoulder chamfer, and
   a second block piece having an axially inner edge abutting on the shoulder main groove that is not chamfered along its substantially entire length or alternatively less chamfered by a substantially constant width less than the axially inner shoulder chamfer along its substantially entire length, and on both sides of each of the shoulder main grooves, each of the axially inner shoulder chamfers has an overlap with one of the axially outer crown chamfers in the tire circumferential direction.

2. The pneumatic tire according to claim 1, wherein with respect to the crown blocks and the shoulder blocks disposed on both sides of each said shoulder main groove, the first block pieces of the crown blocks and the first block pieces of the shoulder blocks are disposed on one side in the tire circumferential direction of the respective paired second block pieces.

3. The pneumatic tire according to claim 1, wherein said crown sipe is zigzag.

4. The pneumatic tire according to claim 3, wherein said crown sipes comprises
   an axially outer gently inclined part extending axially inwardly from the shoulder main groove,
   an axially inner gently inclined part extending axially outwardly from the center main groove, and
   a steeply inclined part connects between the axially outer gently inclined part and the axially inner gently inclined part, and
   the steeply inclined part is inclined at an angle of not less than 80 degrees with respect to the tire axial direction.

5. The pneumatic tire according to claim 1, wherein each said shoulder block is provided with a narrow longitudinal shoulder groove extending between the circumferentially adjacent shoulder lateral grooves.

6. The pneumatic tire according to claim 5, wherein in each said shoulder block, the shoulder sipe terminates without reaching to the narrow longitudinal shoulder groove.

7. The pneumatic tire according to claim 5, wherein the shortest distance (La) between said narrow longitudinal shoulder groove and the shoulder sipe is in a range from 5% to 20% of the axial width (Ws) of the shoulder block.

8. The pneumatic tire according to claim 1, wherein the shoulder lateral grooves are each composed of an axially inside portion extending axially outwardly from the shoulder main groove, and an axially outside portion extending axially outwardly from the axially inside portion and being larger in the groove width than the inside portion.

9. The pneumatic tire according to claim 8, wherein the groove width (W4) of said axially inside portion is in a range from 30% to 50% of the groove width (W5) of said axially outside portion.

10. The pneumatic tire according to claim 1, wherein
each of the second block pieces of the crown blocks has an axially inner edge abutting on the center main groove which is chamfered by a substantially constant width along its substantially entire length to define an axially inner crown chamfer,
each of the first block pieces of the crown blocks has an axially inner edge abutting on the center main groove which is not chamfered along its substantially entire length or alternatively less chamfered by a substantially constant width less than the axially inner crown chamfer along its substantially entire length, and
the axially inner crown chamfers on one side of the center main groove each have an overlap part in the tire circumferential direction with one of the axially inner crown chamfers on the other side of the center main groove.

11. The pneumatic tire according to claim 1, wherein each said crown lateral groove comprises a deep central portion in its length direction, and a shallow end portion positioned on each side of the deep central portion in the length direction and having a groove depth less than that of the deep central portion.

12. The pneumatic tire according to claim 1, wherein the circumferential length (L2) of said axially inner shoulder chamfer is in a range from 35% to 55% of one pitch length (P1) in the tire circumferential direction of the shoulder lateral grooves.

* * * * *